Figure 1:
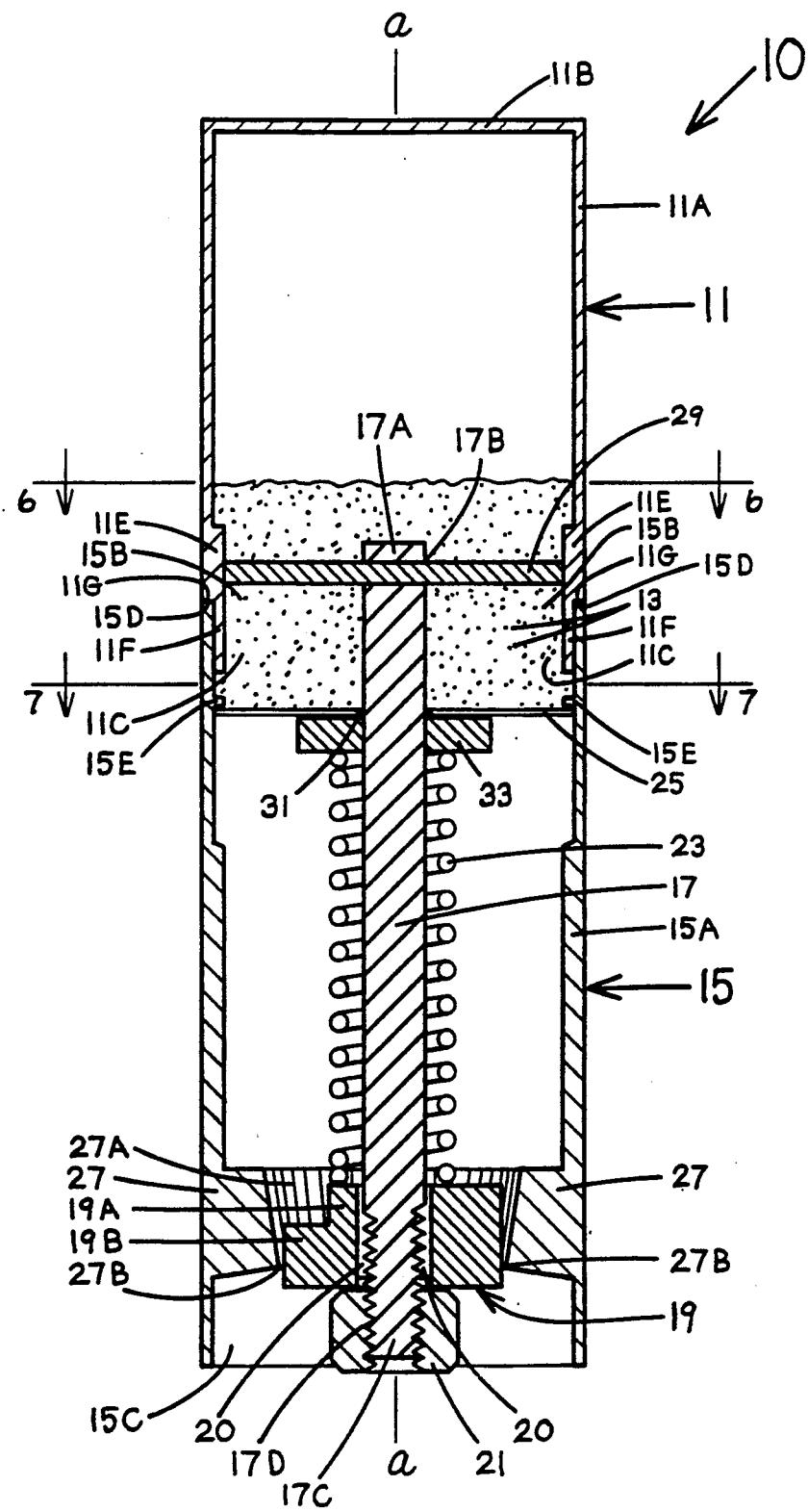

United States Patent [19]

Lowe

[11] Patent Number: 5,145,119
[45] Date of Patent: Sep. 8, 1992

[54] COMBINED SALT SHAKER AND PEPPER MILL

[76] Inventor: John P. Lowe, 1020 Prospect St., Apt. 303, Lansing, Mich. 48912

[21] Appl. No.: 793,480

[22] Filed: Nov. 18, 1991

[51] Int. Cl.$^5$ .............................................. B02C 19/00
[52] U.S. Cl. ............................. 241/101.2; 222/142.4; 241/169.1
[58] Field of Search ................ 222/142.1–142.7, 222/192; 241/101.2, 168, 169, 169.1

[56] References Cited

U.S. PATENT DOCUMENTS

| | | | |
|---|---|---|---|
| 595,481 | 12/1897 | Jenatschke et al. | 241/101.2 |
| 1,264,134 | 4/1918 | Quick | 241/168 X |
| 1,439,259 | 12/1922 | Pasnik | 241/169 X |
| 2,688,448 | 9/1954 | Lenz | 241/169.1 |
| 2,974,887 | 1/1960 | Grandinetti | 241/101.2 |
| 3,154,220 | 10/1964 | Koralewski | 222/142.4 |
| 3,485,416 | 12/1969 | Fohrman | 222/142.1 |
| 3,827,641 | 8/1974 | Andersson | 241/169.1 X |
| 4,530,470 | 7/1985 | Beilstein | 222/142.7 X |
| 4,685,627 | 8/1987 | Lee | 241/169.1 |
| 4,865,258 | 9/1989 | Smith et al. | 241/169.1 |

FOREIGN PATENT DOCUMENTS

| | | | |
|---|---|---|---|
| 9143 | 6/1902 | Fed. Rep. of Germany | 222/142.4 |
| 1166983 | 4/1964 | Fed. Rep. of Germany | 241/169.1 |
| 2818216 | 11/1978 | Fed. Rep. of Germany | 241/169.1 |
| 3430196 | 12/1985 | Fed. Rep. of Germany | 241/169.1 |
| 306013 | 3/1955 | Switzerland | 241/168 |

*Primary Examiner*—Kevin P. Shaver
*Attorney, Agent, or Firm*—Ian C. McLeod

[57] ABSTRACT

A food seasoning shaker and pepper mill unit (10) for dispensing salt and the like and for dispensing pulverized peppercorn. The shaker and pepper mill unit is comprised of a food seasoning shaker (11) for dispensing food seasoning (13) and a pepper mill (15) for grinding peppercorn into a food seasoning. The shaker is mounted on the pepper mill by a coil spring (23) mounted on a central shaft (17) that connects between the shaker and the pepper mill. The shaft and coil spring also serve to hold a rotor (19), which is mounted on the shaft, in a spaced relationship with a stator (27) portion of the pepper mill. The rotor is adjustable on the shaft to enable a user of the unit to regulate the fineness or coarseness of the pulverized peppercorn leaving the pepper mill. The peppercorn are ground between the rotor and the stator by rotating the shaker relative to the pepper mill. This causes the shaft to rotate, which in turn rotates the rotor relative to the stator. To fill the unit, the shaker and the pepper mill are held in an inverted position and the pepper mill is moved axially away from the shaker. This causes the pepper mill to partially separate from the food seasoning shaker and causes the stator to move away from the rotor. The peppercorn and food seasoning can then be introduced into the respective pepper mill and the food seasoning shaker.

20 Claims, 5 Drawing Sheets

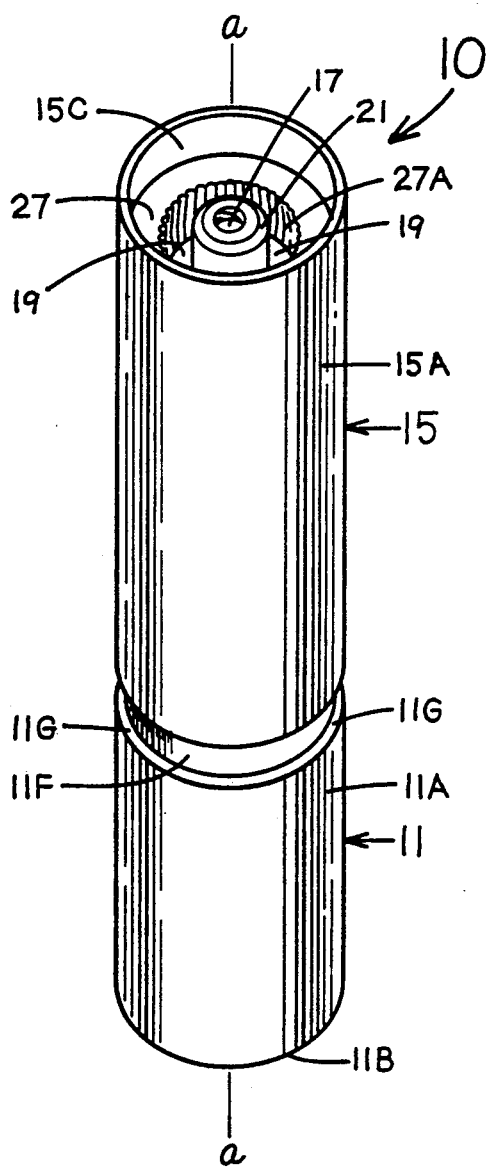
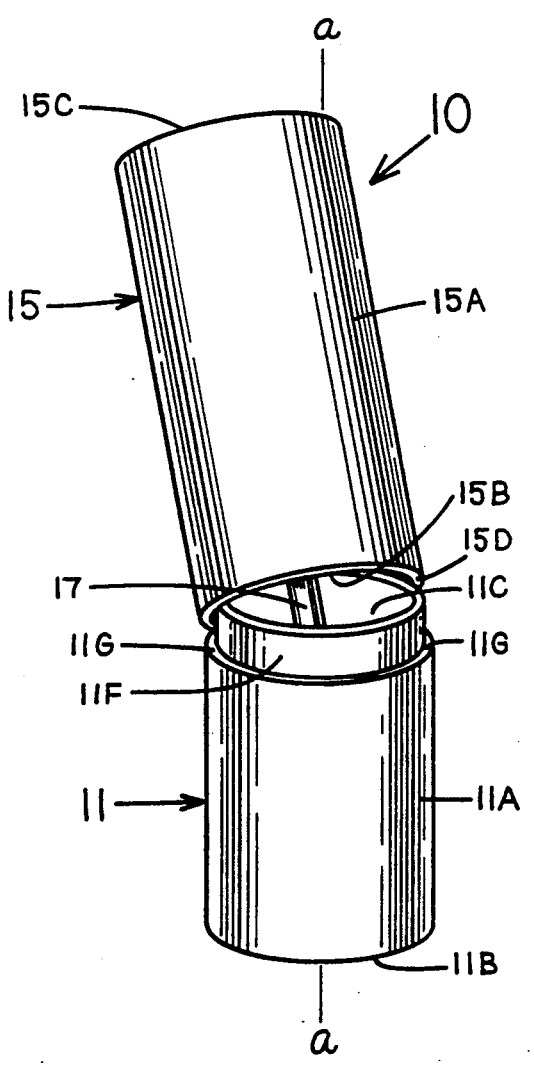

COMBINED SALT SHAKER AND PEPPER MILL

BACKGROUND OF THE INVENTION

(1) Field of the Invention

The present invention relates to a combination pepper mill and food seasoning dispenser. In particular, the present invention relates to a combination unit having a pepper mill section and a salt or other food seasoning dispensing section mounted together along a longitudinal axis of the sections. A plate is mounted in the pepper mill section, adjacent to the salt section, and serves to segregate the respective sections. The salt section has a perforated end wall for dispensing salt and other food seasonings. A first end of a centrally located shaft is mounted inside the salt section and extends through the plate to a second end of the shaft mounted in a lower, open end of the pepper mill section, opposite the salt section. A grinder wheel is mounted on the second end of the connecting shaft and is in an adjustable, closely spaced relationship with a serrated stator portion of the pepper mill. A biasing spring means is mounted on the shaft and extends between the plate and the grinder wheel. Together, the biasing spring and the shaft serve to hold the pepper mill section on the salt section and to hold the grinder wheel adjacent the serrated stator. That way, when the salt section is rotated relative to the pepper mill section, the grinder wheel rotates relative to the stator to pulverize peppercorn held in the pepper mill section. Also, the connecting shaft is in a sealed relationship with the segregating plate so that salt cannot move past the plate and enter the pepper mill section.

To fill the respective salt and pepper mill sections, the combination dispenser is inverted with the pepper mill section positioned vertically above the salt section. The sections are then pulled axially apart, against the tension of the biasing spring. This causes the salt section to partially separate from the pepper mill section for filling the salt section. At the same time, the open end of the pepper mill section moves away from the grinder wheel to allow for filling the pepper mill section with peppercorn. Food seasoning that can be dispensed from the salt dispenser section includes salt in the form of both sodium chloride and calcium chloride along with other herbs and spices that are added to food, primarily for the savor that the food seasoning imparts to the food.

The present invention also provides a pepper mill having a cover held on a container by a centrally located shaft and biasing spring. A grinder wheel is mounted on the shaft and is rotatable relative to a stator to pulverize peppercorn held in the pepper mill. In a similar manner as the combination pepper mill and food seasoning dispenser, the cover is moveable axially away from the container. This causes the shaft and grinder wheel to move relative to the stator to allow for filling the pepper mill with peppercorn.

(2) Prior Art

The prior art has described various types of combination containers for dispensing food seasoning such as salt and pepper and the like. The prior art containers use a variety of methods for filling the containers. Illustrative of the prior art combination containers are U.S. Pat. No. 595,481 to Jenatschke and Fischer; U.S. Pat. No. 1,264,134 to Quick; U.S. Pat. No. 2,974,887 to Grandinetti and U.S. Pat. No. 3,485,416 to Fohrman.

U.S. Pat. No. 595,481 to Jenatschke and Fischer describes a condiment box having a salt compartment mounted on top of a pepper compartment. The salt and pepper compartments are adapted to rotate relative to each other. The salt compartment has a perforated end wall for dispensing salt. The end wall is removeable to load salt into the salt compartment and to access a wing nut mounted on a centrally located stem that extends to a grinding element in the pepper compartment. The wing nut is unthreaded after the perforated end wall is removed from the salt dispenser to access the pepper compartment for filling the pepper compartment.

U.S. Pat. No. 1,264,134 to Quick describes a combined salt shaker container and a pepper grinder container, stacked one on top of the other. A centrally located post extends from a pepper grinding bur to an arm of the post that engages an end wall of the salt shaker. When the salt shaker is rotated relative to the pepper grinder, peppercorn are ground between the grinder bur and a burred member of the pepper grinder. A collar member provides for separating the salt shaker container from the pepper grinder container for filling the salt shaker and the pepper grinder.

U.S. Pat. No. 2,974,887 to Grandinetti describes a salt shaker container and a pepper mill container mounted on top of each other. The salt shaker has an upper perforated lid with a filler opening that aligns with a second end wall plate for filling the salt shaker. The pepper mill is provided with a filler hole in the sidewall of the pepper mill that aligns with an opening in a skirt mounted on the sidewall of the pepper mill. The skirt is rotated so that the opening in the skirt and the filler hole in the pepper mill align for filling the pepper mill. A centrally located shaft extends through a boss located on the bottom of the salt shaker to a grinder element in the pepper mill. A spring is mounted on the shaft and together the spring and shaft serve to hold the salt shaker on the pepper mill; however, the salt shaker is not separable from the pepper mill. When the salt shaker is rotated relative to the pepper mill, the grinder element is also rotated to grind peppercorn held in the pepper mill.

U.S. Pat. No. 3,485,416 to Fohrman describes a combination salt and pepper shaker having a salt container mounted on top of a pepper container by a coupling. The containers have opposed end walls with perforations for dispensing salt and pepper. The containers are removeable from the coupling for filling. Covering caps are provided on each end wall to prevent dispensing from the compartments until required.

U.S. Pat. No. 1,439,259 to Pasnik describes a unitary salt dispenser having a valved bottom and a removeable cover. A depressible plunger is mounted in the bottom of the salt dispenser and serves to release salt from the dispenser when the plunger is depressed. The cover is partially separable from the salt dispenser for filling the dispenser. However, the cover is connected to the plunger by a shaft and during filling, the plunger has a tendency to move out of the bottom of the salt dispenser and spill salt, if the salt dispenser is not completely empty.

What is needed is a combination salt and pepper dispenser that is held together by a centrally located shaft that provides for partially separating the two dispensers for filling the dispensers. The centrally located shaft negates the need for aligning filler openings for filling the salt and pepper dispensers. The problem with aligning filler openings is that a build-up of food seasoning often accumulates between the rotatable members having the filler openings. This build-up causes the rotatable members to become loose and wear out. Also, the filler openings are usually relatively small, which makes it difficult to fill the dispenser through the openings without spilling food seasoning. Those devices that require part of the dispenser to be disassembled for filling, risk having the disassembled parts becoming lost.

OBJECTS

It is therefore an object of the present invention to provide a combination unit having a salt dispenser and a pepper mill mounted together along a longitudinal axis of the unit by a centrally located shaft that connects between the salt dispenser and the pepper mill. Further, it is an object of the present invention to provide a compartmentalized salt and pepper dispenser having a central shaft that extends between the dispensers with a biasing spring means mounted on the shaft to hold the dispensers together, wherein a grinding element is adjustably mounted on the connecting shaft, spaced from the salt dispenser and wherein the salt and pepper dispensers are partially separable along the axis and against the tension of the spring to move the grinder element into the pepper dispenser so that both the salt and pepper dispensers are opened for filling the respective dispensers. Still further, it is an object of the present invention to provide a pepper mill having a central shaft that extends between a cover and a container portion of the pepper mill with a biasing spring means mounted on the shaft to hold the cover on the container, wherein a grinding element is adjustably mounted on the connecting shaft, spaced from the cover and wherein the cover and container portion are partially separable along the axis and against the tension of the spring to move the grinder element into the container for filling the pepper mill. Finally, it is an object of the present invention to provide a combination salt dispenser and pepper mill that is simple to build and inexpensive to manufacture. These and other objects of the present invention will become increasingly apparent by reference to the following description and to the drawings.

IN THE DRAWINGS

FIG. 1 is a cross-sectional view of a food seasoning shaker and pepper mill unit 10 of the present invention which shows a food seasoning shaker 11 holding food seasoning 13 and mounted on a pepper mill 15 by a central shaft 17 and a coil spring 23, and with a rotor 19 mounted on the shaft 17 and cooperating in conjunction with a stator 27 for grinding peppercorn held in the pepper mill 15.

Figure 1A:
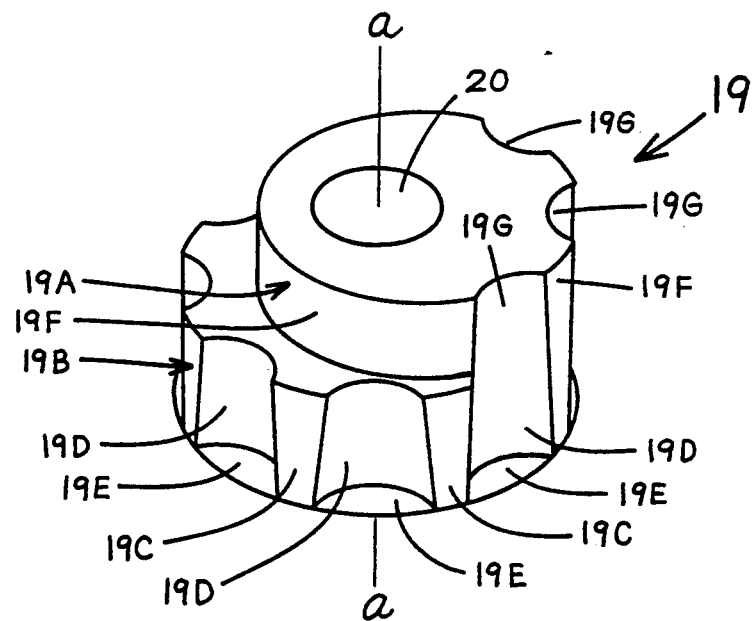

FIG. 1A is an isometric view of the rotor 19 shown in FIG. 1 showing the rotor 19 having blades 19D, 19E and 19G.

FIG. 2 is a perspective view of the shaker and pepper mill unit 10 shown in FIG. 1 in an inverted position and with the pepper mill 15 moved axially away from the shaker 11 for filling the pepper mill with peppercorn.

FIG. 3 is a perspective view of the shaker and pepper mill unit 10 shown in FIG. 2 in the inverted position and with the pepper mill 15 partially separated from the shaker 11 for filling the shaker with food seasoning 13.

Figure 4:
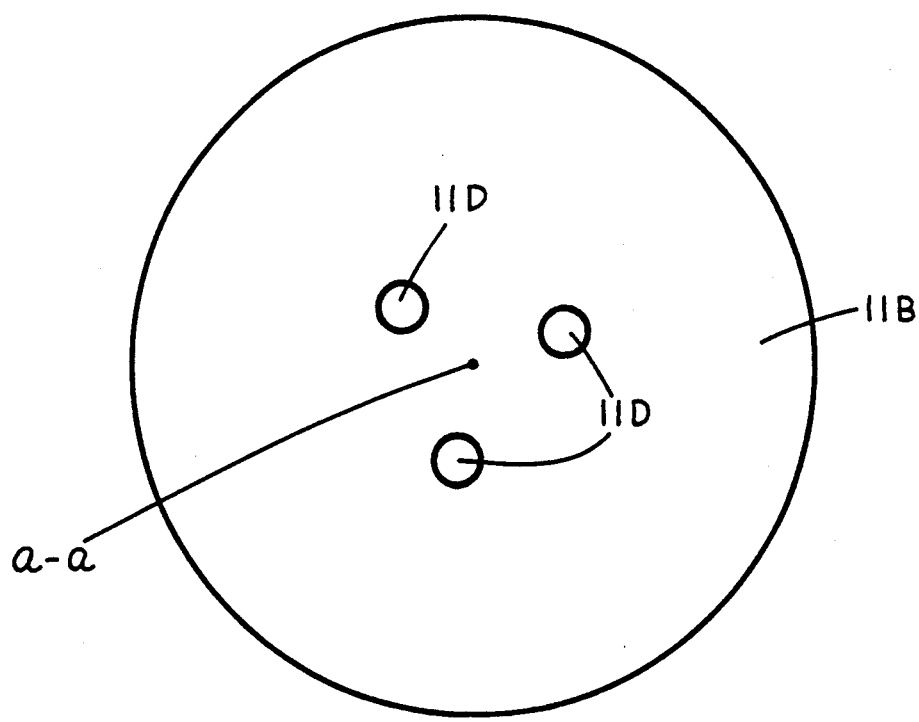

FIG. 4 is a top plan view of the shaker and pepper mill unit 10 shown in FIG. 1 and particularly showing the top wall 11B of the shaker 11 with perforations 11D for dispensing food seasoning 13 from the shaker 11.

Figure 5:
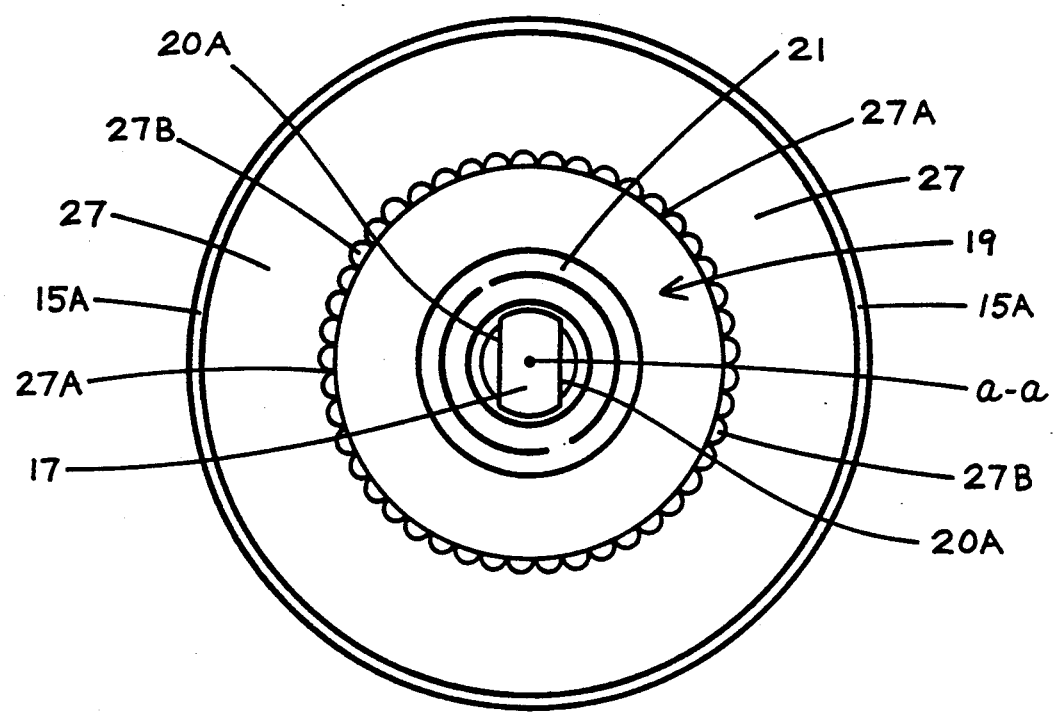

FIG. 5 is a bottom plan view of the shaker and pepper mill unit 10 shown in FIG. 1 and particularly showing the bottom of the pepper mill 15 with the rotor 19 mounted on the shaft 17 and in a closely spaced relationship with the lower edge 27B of the serrations 27A on the stator 27.

Figure 6:
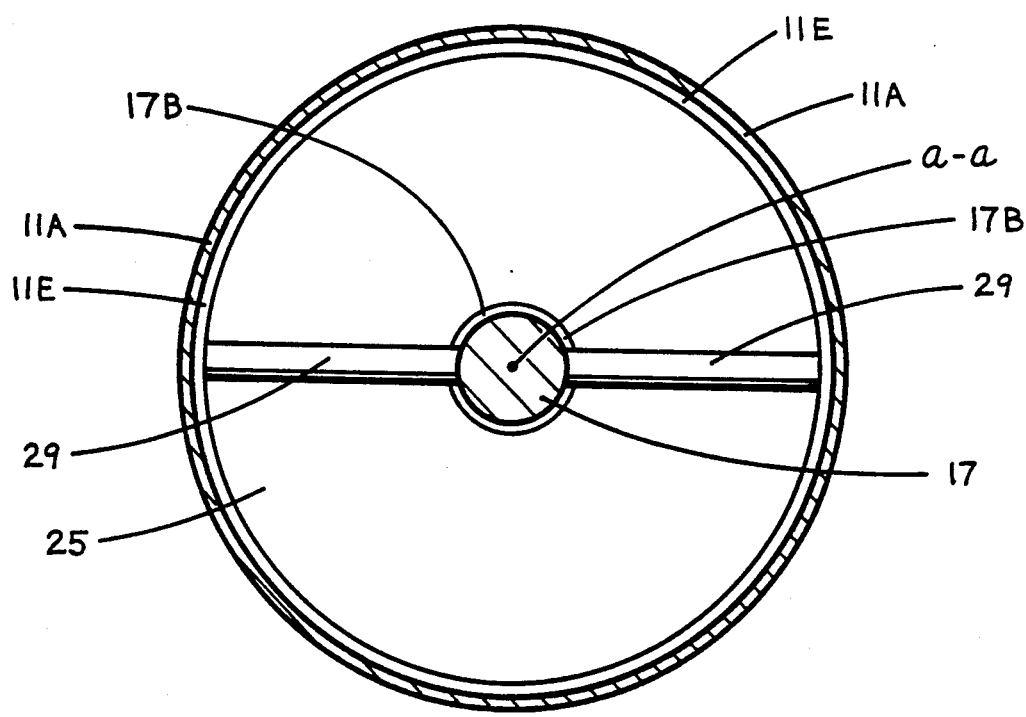

FIG. 6 is a cross-sectional view along line 6—6 of FIG. 1 showing the anchor rod 29 mounted on an inner enlarged portion 11E of the sidewall 11A of the shaker 11 and mounted through an opening 17B in a first end 17A of the shaft 17.

Figure 7:
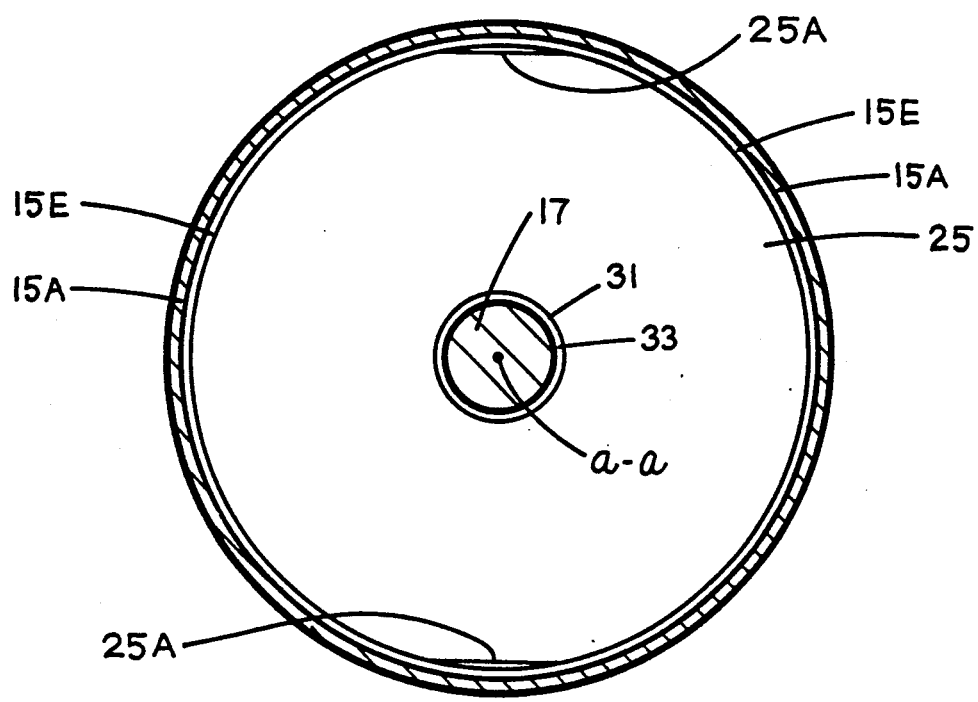

FIG. 7 is a cross-sectional view along line 7—7 of FIG. 1 showing the flat surfaces 25A in partition plate 25 that serve for removing the plate 25 from the pepper mill 15.

Figure 8:
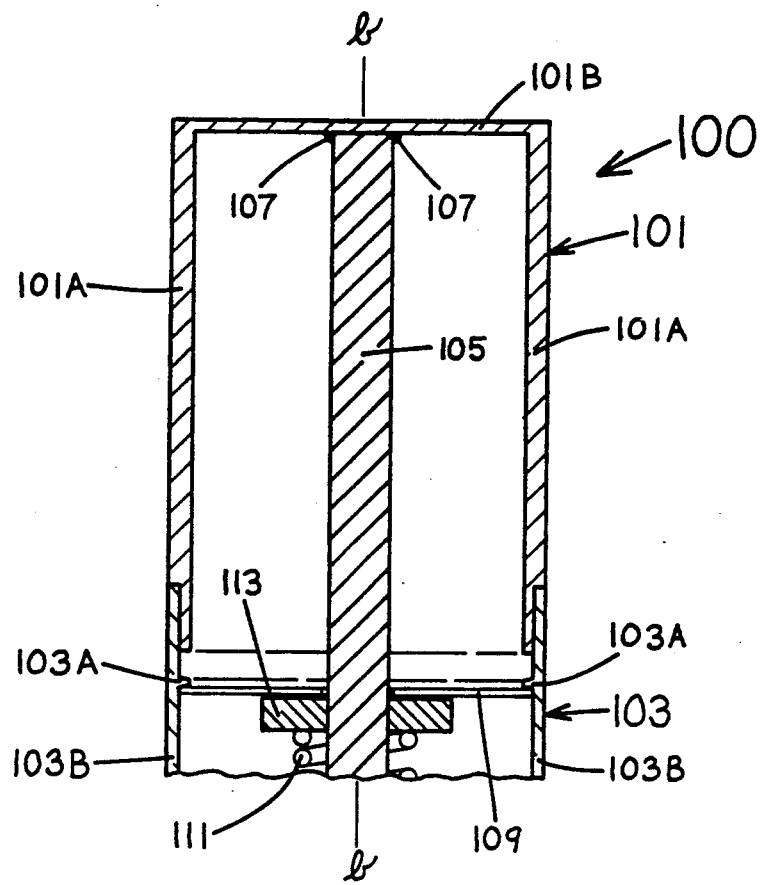

FIG. 8 is a partial cross-sectional view of a pepper mill 100 having a cover 101 held on a container 103 by a shaft 105 and a spring 111.

GENERAL DESCRIPTION

The present invention relates to a combined food seasoning shaker and pepper mill, which comprises: a first, pepper dispenser; a second, food seasoning dispenser having a perforated end wall spaced from the pepper section for dispensing food seasoning therefrom, wherein the food seasoning dispenser and the pepper dispenser are mounted together along a longitudinal axis of the dispensers for rotational movement around the axis relative to each other; connection means that extends between and is partially mounted in each dispenser with a first end of the connection means mounted on an inner portion of the food seasoning dispenser; a pepper grinder means mounted at a first, open end of the pepper dispenser, opposite the food seasoning dispenser, the grinder means, including a rotor means, that is mounted on a second end of the connection means in a closely spaced relationship with a serrated stator portion of the pepper dispenser; a closure means mounted inside the pepper dispenser, spaced from a second, open end of the pepper dispenser to segregate the pepper dispenser from the food seasoning dispenser, with the connection means mounted through an opening in the closure means to provide for partially mounting the connection means in each dispenser; and a biasing means biasing the rotor means towards the serrated stator portion of the pepper dispenser, wherein the connection means is rotatable with the food seasoning dispenser to rotate the rotor means and activate the grinder means on relative rotation of the pepper and food seasoning dispensers and wherein the connection means provides for relative movement between the salt dispenser and the pepper dispenser so that the food seasoning dispenser and the connection means with the rotor means are moveable axially away from the pepper dispenser and against the bias of the biasing means to provide a spaced relationship between the grinder element and the serrated stator portion of the pepper dispenser to provide for loading the pepper dispenser and to provide a spaced relationship between the food seasoning and pepper dispensers to permit loading the food seasoning dispenser with food seasoning.

The food seasoning shaker and the pepper mill can be made of plastic, metal, wood, stone or other like materials. Metal is preferred for the stator in order to ensure that the serrations on the stator retains a sharp edge even after repeated use. Therefore, if the stator is an integral part of the pepper mill, it is also preferable that the pepper mill is made of metal. However, the stator and the pepper mill can be separable parts. In this case, the stator can be mounted to the pepper mill by any suitable securing means. It is also preferred that the rotor be made of a metal material.

The spacer ring which mounts on the shaft, against the partition plate, is preferably made of a teflon or an elastomeric material. The purpose of the spacer ring is to seal the opening between the partition plate and the shaft. However, any acceptably sealing means is contemplated by the scope of the present invention.

Finally, while a coil spring is preferred as the resilient spring means that holds the food seasoning shaker on the pepper mill, the spring means can be provided by a leaf spring, or any other suitable spring means that will hold the food seasoning shaker on the pepper mill and that will bias the rotor in a spaced relationship with the stator.

SPECIFIC DESCRIPTION

The combined food seasoning shaker and pepper mill unit 10 of the present invention is shown in FIGS. 1 to 7. As shown in a cross-sectioned, upright position in FIG. 1, the shaker and pepper mill unit 10 comprises a food seasoning shaker 11 for holding food seasoning 13, a pepper mill section 15 for holding peppercorns (not shown) and a central shaft 17 extending between the food seasoning container 11 and the pepper mill 15. A grinder wheel or rotor 19 is mounted on the shaft 17 and held in position by a retainer nut 21 having a knurled outer surface 21A for gripping the nut 21 and a coil spring 23. The coil spring 23 is mounted on and around the shaft 17 and biases between the rotor 19 and a partition plate 25, which separates the shaker 11 from the pepper mill 15. The food seasoning 13 is preferably salt or the like.

As shown in FIG. 1, the food seasoning shaker 11 has a circular cross-section along and around a longitudinal axis a—a and is formed by a cylindrical sidewall 11A depending from a top wall 11B to an opened end 11C. The top wall 11B is provided with a plurality of openings or perforations 11D (FIG. 4) for dispensing food seasoning such as salt 13 and the like from the food seasoning container 11.

As shown in the upright position in FIG. 1, the pepper mill 15 is mounted axially below the food seasoning shaker and has a circular cross-section along and around the longitudinal axis a—a. The pepper mill 15 includes a sidewall 15A that extends from an upper, open end 15B to a lower, open end 15C. An integral stator 27 is formed on the inside of the sidewall 15A, spaced above the lower end 15C. The stator 27 has an annular serrated inner surface 27A with a frusto-conical shape that extends upwardly and outwardly along the axis a—a.

An inner annular enlarged portion 11E of the sidewall 11A of the shaker 11 extends around the axis a—a and around the inside of the sidewall 11A, spaced from the open end 11C of the shaker 11. An inner annular lip 11F extends from the enlarged portion 11E at the lower, open end 11C of the shaker 11. The annular lip 11F forms an annular ledge 11G that mounts on the upper end 15D of the sidewall 15A of the pepper mill 15. In this position, the annular lip 11F is mounted against and radially inside of the inner surface of the sidewall 15A of the pepper mill 15 and helps to hold the shaker 11 on the pepper mill 15.

The enlarged portion 11E also provides for fixably mounting an anchor rod 29 across the axis a—a (FIG. 6). Rod 29 preferably has a circular cross-section along the length of the rod 29 and extends through an opening 17B in the first end 17A of the shaft 17. The present invention contemplates that the rod 29 need not necessarily have a circular cross-section along the length of the rod 29. Instead, rod 29 can have various cross-sectional shapes. What is important is that rod 29 mounts on the annular enlargement 11E and serves as an anchor for the first end 17A of the shaft 17. Also, the circular cross-sectioned shape of rod 29 helps the shaft 17 to slide on the rod 29 during filling of the shaker 11, as will be explained hereinafter.

The pepper mill 15 is further provided with an inner annular rim 15E formed on the inside of the sidewall 15A, adjacent to the upper end 15B of the pepper mill 15. The partition plate 25 is seated on the annular rim 15E, opposite the upper, open end 15B of the pepper mill 15 and serves to segregate the food seasoning shaker 11 from the pepper mill 15. As shown in FIG. 7, the plate 25 has a pair of flat surfaces 25A, spaced diametrically around the circumference of the plate 25. The flat surfaces 25A enables the plate 25 to be removeably mounted on the annular rim 15E. That way, the plate 25 can be removed from the pepper mill 15 for cleaning the shaker and pepper mill unit 10.

To remove the plate 25 from the pepper mill 15, the plate 25 is turned so that the plane of the plate 25 is bisected by the axis a—a. The plate 25 is then able to be removed through the open upper end 15B of the pepper mill 15 with the flat surfaces 25A on the plate 25 sliding past the annular rim 15E. Another embodiment for removing the plate 25 from the pepper mill 15, which is not shown, comprises the annular ring 15E having diametrically opposed grooves cut to a depth corresponding to the diameter of the sidewall 15A of the pepper mill 15. That way, when the plate 25 is positioned so that the plane of the plate 25 is bisected by the axis a—a, the plate 25 is able to slide past the annular rim 15E through the grooves.

The plate 25 has a central opening 31 that is aligned coaxially with the axis a—a. Opening 31 enables the central shaft 17 to extend from the first end 17A, which is mounted on the anchor rod 29 in the food seasoning shaker 11, through the opening 31 in the plate 25 and through the stator 27 to a second end 17C of the shaft 17. The second end 17C is positioned adjacent to the open, lower end 15C of the pepper mill 15.

As shown in FIG. 5, the second end 17C of the shaft 17 has a generally rectangular cross-section perpendicular to the axis a—a and is provided with threads 17D that threadably mate with the retainer nut 21. The retainer nut 21 serves to hold the rotor 19 on the second end 17C of the shaft 17, against the bias of the coil spring 23. In this position, the rotor 19 is mounted adjacent to the stator 27. The coil spring 23 mounts along and around the central shaft 17, between the rotor 19 and a spacer ring 33, and serves to bias the shaker 11 on the pepper mill 13. The spacer ring 33 mounts around the shaft 17 in a closely spaced relationship and abuts against the partition plate 25. That way, the spacer ring 33 seals the space between the opening 31 in the plate 25 and the shaft 17 so that food seasoning 13 held in the shaker 11 does not fall into the pepper mill 15, through the opening 31 in the plate 25.

The rotor 19 is adjustably mounted on the rectangular cross-sectioned second end 17C of the shaft 17 (FIG. 5), and in conjunction with the stator 27 acts as a grinding mechanism to pulverize peppercorn (not shown) held in the grinding mill 15. As shown in FIG. 1, the rotor 19 is comprised of an upper section 19A and a lower section 19B. As shown in isometric view in FIG.

1A, the lower section 19B has a sidewall 19C with a generally circular cross-section around the axis a—a. The circular integrity of the sidewall 19C is interrupted by a plurality of blades 19D, spaced radially around the circumference of the sidewall 19C. The blades 19D have an arcuate, concave shape formed into the sidewall 19C and extend into a relatively flat cutting blade 19E at the base of the blades 19D. The upper section 19A has a sidewall 19F with an irregular or egg-shaped cross-section perpendicular to the axis a—a. The upper section 19A is also provided with cutting blades 19G that are extensions of some of the blades 19D of the lower section 19B. The part of the sidewall 19F of the upper section 19A that curves away from axial alignment with the sidewall 19C of the lower section 19B has a smooth shape, and is not provided with blades 19F.

The rotor 19 is also provided with an opening 20 that provides for mounting the rotor 19 on the shaft 17. The opening 20 has a generally circular cross-section along the axis a—a (FIG. 1A), that tapers to a pair of somewhat rounded indentations 20A (FIG. 5), that mate with the shaft 17. That way, when the shaker 11 is rotated about the axis a—a relative to the pepper mill 15, the shaft 17 is also rotated, which serves to rotate the rotor 19. The blades 19D, 19E and 19G then act to pulverize the peppercorn held in the pepper mill 15 against the stator 27 to form a finely ground powder, suitable for food seasoning.

The retainer nut 21 and the coil spring 23 enable the rotor 19 to be adjustable axially along the shaft 17 with respect to the stator 27. As shown in FIG. 1, the lower section 19B of the rotor 19 is in a closely spaced relationship with a lower edge 27B of the serrated surface 27A of the stator 27. The serrated surface 27A tapers upwardly and outwardly along the axis a—a in a frusto-conical shape. Since the lower section 19B of the rotor 19 has a generally circular cross-section perpendicular to the axis a—a of the shaft 17, tightening and untightening the retainer nut 21 on the threads 17D of the shaft 17 causes the rotor 19 to move axially up and down along the shaft 17. This enables the annular space between the rotor 19 and the stator 27 to be adjusted. That way, a user of the shaker and pepper mill unit 10 is able to adjust the fineness or coarseness of the pulverized peppercorn ground between the rotor 19 and the stator 27.

IN USE

To grind peppercorn into a pulverized state for use as a food seasoning, a user holds the shaker and pepper mill unit 10 in the upright position shown in FIG. 1 with the food seasoning shaker 11 and the pepper mill 15 held in separate hands. Then, rotating the food seasoning shaker 11 relative to the pepper mill 15 causes the rotor 19 to rotate on the shaft 17 relative to the stator 27. This occurs because the shaft 17 is a rigid member that is fixably mounted to the food seasoning shaker 11 by the anchor rod 29 and the rotor 19 is rotatably mounted on the shaft 17 by the rectangular cross-sectioned second end 17C of the shaft 17 that mates with the indentations 20A in the opening 20 of the rotor 19.

During the grinding process, as the rotor 19 is rotated relative to the stator 27, peppercorn held in the pepper mill 15 falls into the space between the upper section 19A of the rotor 19 and the stator 27. There the peppercorn are initially broken apart. The partially pulverized peppercorn then fall into the space between the lower section 19B of the rotor 19 and the stator 27 where the peppercorn are ground a second time. The peppercorn are ground until their cross-sectional width is similar to the annular space between the lower section of the rotor 19B and the lower edge 27B of the stator 27. Adjusting the retainer nut 21 causes the annular space between the lower section 19B of the rotor 19 and the stator 27 to vary for changing the fineness or coarseness of the ground peppercorn.

To use the food seasoning shaker 11, the salt and pepper mill unit 10 is held in an inverted position with the pepper mill 15 above the shaker 11. This causes food seasoning 13 held in the shaker 11 to move against the top wall 11B of the shaker 11 and to move through the perforations 11D in the top wall 11B. Moving the shaker and pepper mill unit 10 briskly in an up and down motion increases the amount of food seasoning 13 that moves through the perforations 11D.

When the supply of food seasoning 13 in the shaker 11 and the supply of peppercorn in the pepper mill 15 become depleted, the shaker 11 and pepper mill 15 can be refilled. As shown in FIGS. 2 and 3, refilling is done with the unit 10 in the fill or inverted position with the pepper mill 15 above the shaker 11. To fill the shaker 11, the user grasps the pepper mill 15 and moves the pepper mill 15 axially along the axis a—a, away from the shaker 11 until the annular lip 11E is completely out of the upper end 15B of the pepper mill 15 (FIG. 2). The shaker 11 can then be partially separated from the pepper mill 15 with the first end 17A of the shaft 17 (FIG. 3) tilting on the anchor rod 29. It is also preferred that the first end 17A of the shaft 17 can slide with respect to anchor rod 29 to partially separate the pepper mill 15 from the shaker 11. In the partially separated position, food seasoning 13 can be placed into the shaker 11. The pepper mill 15 is then slid back over the shaker 11 and the coil spring 23 is allowed to unite the pepper mill 15 and the shaker 11 so that the annular ledge 11F rests against the upper edge 15D of the upper end 15B of the pepper mill 15.

If the shaker 11 is not completely empty of food seasoning 13, it is necessary to hold a hand over the openings 11D in the top wall 11B of the shaker 11 to keep food seasoning 13 from moving through the openings 11D. A cover (not shown) can also be mounted on the top wall 11B to hold the food seasoning 13 in the shaker 11.

To fill the pepper mill 15 with peppercorn, the unit is inverted into the fill position as explained above. Peppercorn (not shown) are then loaded into the open end 15C of the pepper mill 15 so that the peppercorn are resting against the stator 27 and rotor 19. The user then grasps the pepper mill 15 and moves the pepper mill 15 axially along the axis a—a, away from the shaker 11 and against the bias of the spring 23, as was described for filling the shaker 11 with food seasoning 13. As shown in FIG. 2, this causes the stator 27 to move away from the rotor 19, a distance sufficient for the peppercorn to fall past the stator 27 and the rotor 19 and into the pepper mill 15. The bias of coil spring 23 is then allowed to unite the pepper mill 15 and the food seasoning shaker 11 so that the annular ledge 11F rests against the upper edge 15D of the upper end 15B of the pepper mill 15.

PEPPER MILL

FIG. 8 shows another embodiment of a pepper mill 100 of the present invention. The pepper mill 100 is similar to the combined food seasoning shaker and pepper mill unit 10, except that the food seasoning shaker 11 has been replaced with a cover 101 for a container 103 which together comprise the pepper mill 100. The cover 101 has a cylindrical sidewall 101A extending from an end wall 101B along a longitudinal axis b—b of the pepper mill 100. A centrally located shaft 105 is fixably mounted to the end wall 100B of the cover 101 along the axis b—b by weld 107 or other suitable securing means. The shaft 105 extends through a plate 109 that is held against an inner annular rim 103A on the sidewall 103B of the container 103 by a biasing spring 111. The plate 109 serves as a closure member to segregate the cover 101 from the container 103. The biasing spring 111 is mounted on the shaft 105 and also serves to bias a rotor (not shown) against a stator portion of the container 103 in a similar manner as explained with respect to the unit 10 shown in FIGS. 1 to 7. A seal 113 is mounted between the spring 111 and the plate 109. When the cover 101 is rotated about the axis b—b relative to the container 103, the rotor is caused to rotate relative to the stator to pulverize peppercorn held in the pepper mill 100 in a similar manner as previously explained. Similarly, the pepper mill 100 is filled in the inverted position by moving the cover 101 along the axis b—b relative to the container 103 to move the rotor away from the stator as has been already described.

It is intended that the foregoing description be only illustrative of the present invention and that the present invention be limited only by the hereinafter appended claims.

I claim:

1. A combined food seasoning shaker and pepper mill, which comprises:
   (a) a first, pepper dispenser;
   (b) a second, food seasoning dispenser having a perforated end wall spaced from the pepper section for dispensing food seasoning therefrom, wherein the food seasoning dispenser and the pepper dispenser are mounted together along a longitudinal axis of the dispensers for rotational movement around the axis relative to each other;
   (c) connection means that extends between and is partially mounted in each dispenser with a first end of the connection means mounted on an inner portion of the food seasoning dispenser;
   (d) a pepper grinder means mounted at a first, open end of the pepper dispenser, opposite the food seasoning dispenser, the grinder means including a rotor means that is mounted on a second end of the connection means in a closely spaced relationship with a serrated stator portion of the pepper dispenser;
   (e) a closure means mounted inside the pepper dispenser, spaced from a second, open end of the pepper dispenser to segregate the pepper dispenser from the food seasoning dispenser, with the connection means mounted through an opening in the closure means to provide for partially mounting the connection means in each dispenser; and
   (f) a biasing means biasing the rotor means towards the serrated stator portion of the pepper dispenser, wherein the connection means is rotatable with the food seasoning dispenser to rotate the rotor means and activate the grinder means on relative rotation of the pepper and food seasoning dispensers and wherein the connection means provides for relative movement between the salt dispenser and the pepper dispenser so that the food seasoning dispenser and the connection means with the rotor means are moveable axially away from the pepper dispenser and against the bias of the biasing means to provide a spaced relationship between the grinder element and the serrated stator portion of the pepper dispenser to provide for loading the pepper dispenser and to provide a spaced relationship between the food seasoning and pepper dispensers to permit loading the food seasoning dispenser with food seasoning.

2. The apparatus of claim 1 wherein the pepper dispenser is a cylindrical shaped member having a circular cross-section perpendicular to the longitudinal axis with the sidewall extending from the first, open end of the pepper dispenser, to the second, open end of the pepper dispenser and wherein the food seasoning dispenser is a cylindrical shaped member having a circular cross-section perpendicular to the longitudinal axis with a sidewall extending from an outer periphery of the perforated end wall to an open end of the food seasoning dispenser mounted on the second, open end of the pepper dispenser.

3. The apparatus of claim 2 wherein the sidewall of the food seasoning dispenser has an inner annular lip at the open end of the sidewall of the food seasoning dispenser and spaced from the perforated end wall, and wherein the annular lip of the food seasoning dispenser mounts on and radially inside of the second, open end of the pepper dispenser to provide for mounting the food seasoning dispenser on the pepper dispenser.

4. The apparatus of claim 1 wherein the rotor means is mounted on the second end of the connection means and held against the biasing means by a retention means, which provides for adjusting the closely spaced relationship between the rotor means and the serrated stator portion of the pepper dispenser.

5. The apparatus of claim 4 wherein the second end of the connection means is a threaded portion of the connection means and wherein the retention means is a threaded nut means.

6. The apparatus of claim 5 wherein the threaded nut means has a knurled outer surface for gripping the threaded nut means to adjust the closely spaced relationship between the rotor means and the serrated stator portion of the pepper dispenser.

7. The apparatus of claim 1 wherein the closure means is a plate means mounted against an inner annular rim provided on an inner surface of the sidewall of the pepper dispenser by the biasing means so that the annular rim is intermediate the closure means and the second, open end of the pepper dispenser when the closure means is mounted in the pepper dispenser to segregate the pepper dispenser from the food seasoning dispenser.

8. The apparatus of claim 7 wherein the opening in the plate means that provides for partially mounting the connection means in each dispenser is provided along the longitudinal axis and wherein a seal means is provided that seals between the plate means and the connection means to help segregate the pepper dispenser from the food seasoning dispenser.

9. The apparatus of claim 7 wherein the plate means as the closure means has a generally circular cross-section perpendicular to the longitudinal axis with the plate means mounted on the inner annular rim on the inner surface of the sidewall of the pepper dispenser and wherein the plate means has a pair of diametrically opposed reduced cross-section portions that provide a cross-section of the plate means less than a diameter across the axis of the inner annular rim so that the plate means is removeable past the inner annular rim towards the second open end of the pepper dispenser.

10. The apparatus of claim 1 wherein the connection means is mounted along the longitudinal axis with the first end of the connection means connected to the inner portion of the food seasoning dispenser by an anchor means that has spaced apart ends, which are mounted on diametrically opposed inner surfaces of the sidewall of the food seasoning dispenser.

11. The apparatus of claim 10 wherein the anchor means provides for relative movement with the first end of the connection means to provide for relative movement between the food seasoning dispenser and the pepper dispenser when the food seasoning and pepper dispenser are axially separated to assist in filling the food seasoning dispenser with food seasoning.

12. The apparatus of claim 10 wherein the biasing means is provided along and around the longitudinal axis on the connection means and is mounted on the rotor means and on the closure means, and wherein the biasing means serves to hold the rotor means against a retention means mounted on the second end of the connection means, and to hold the closure means against an inner annular rim on an inner surface of the sidewall of the pepper dispenser.

13. The apparatus of claim 12 wherein the biasing means is a coil spring means and wherein the anchor means is a rod means mounted on the inner surface of the sidewall of the food seasoning dispenser perpendicular to the longitudinal axis and bisected by the axis.

14. The apparatus of claim 11 wherein the anchor means connecting the first end of the connection means to the food seasoning dispenser is mounted in an opening in the first end of the connection means and wherein the anchor means is in a slideable relationship with the opening in the connection means so that when the food seasoning dispenser and the connection means are moved axially away from the pepper dispenser and against the bias of the biasing means to provide a spaced relationship between the food seasoning dispenser and the pepper dispenser, the food seasoning dispenser and the anchor means are slideably moveable in the lateral direction relative to the first end of the connection means to partially separate the food seasoning dispenser from the pepper dispenser to permit loading the food seasoning dispenser.

15. The apparatus of claim 1 wherein the serrated stator portion of the grinder means is provided annularly around an inside sidewall of the pepper dispenser, adjacent to the first, open end of the pepper dispenser.

16. The apparatus of claim 1 wherein the pepper dispenser and the food seasoning dispenser are made of a metal material.

17. A combined pepper mill, which comprises:
(a) a container portion having a sidewall extending along and around a longitudinal axis of the pepper mill from a bottom to an open, upper end of the container portion;
(b) a cover means removeably mounted on the open, upper end of the container portion to form a closure for the container portion;
(c) connection means that extends between and is partially mounted in the container portion and the cover means with a first end of the connection means mounted on an inner portion of the cover means;
(d) a pepper grinder means mounted at the bottom of the container portion, opposite the cover means, the grinder means including a rotor means that is mounted on a second end of the connection means in a closely spaced relationship with a serrated stator portion of the container portion;
(e) a biasing means biasing the rotor means towards the serrated stator portion of the container portion, wherein the connection means is rotatable with the cover means to rotate the rotor means and activate the grinder means on relative rotation of the cover means and the container portion of the pepper mill and wherein the connection means provides for relative movement between the cover means and the container portion so that the cover means and the connection means with the rotor means are moveable axially away from the container portion and against the bias of the biasing means to provide a spaced relationship between the grinder element and the serrated stator portion of the container portion to provide for loading the pepper mill.

18. The pepper mill of claim 17 wherein a closure means is mounted inside the container portion, spaced from the open, upper end of the container to segregate the container portion from the cover means, with the connection means mounted through an opening in the closure means to provide for partially mounting the connection means in the cover means and the container portion.

19. The apparatus of claim 18 wherein the opening in the closure means that provides for partially mounting the connection means in the cover means and the container portion is provided along the longitudinal axis and wherein a seal means is provided that seals between the closure means and the connection means to help segregate the cover means from the container portion of the pepper mill.

20. The apparatus of claim 19 wherein the biasing means is provided along and around the longitudinal axis on the connection means and is mounted on the rotor means and on the closure means, and wherein the biasing means serves to hold the rotor means against a retention means mounted on the second end of the connection means, and to hold the closure means against an inner annular rim on an inner surface of the sidewall of the container portion of the pepper mill.

* * * * *